United States Patent Office

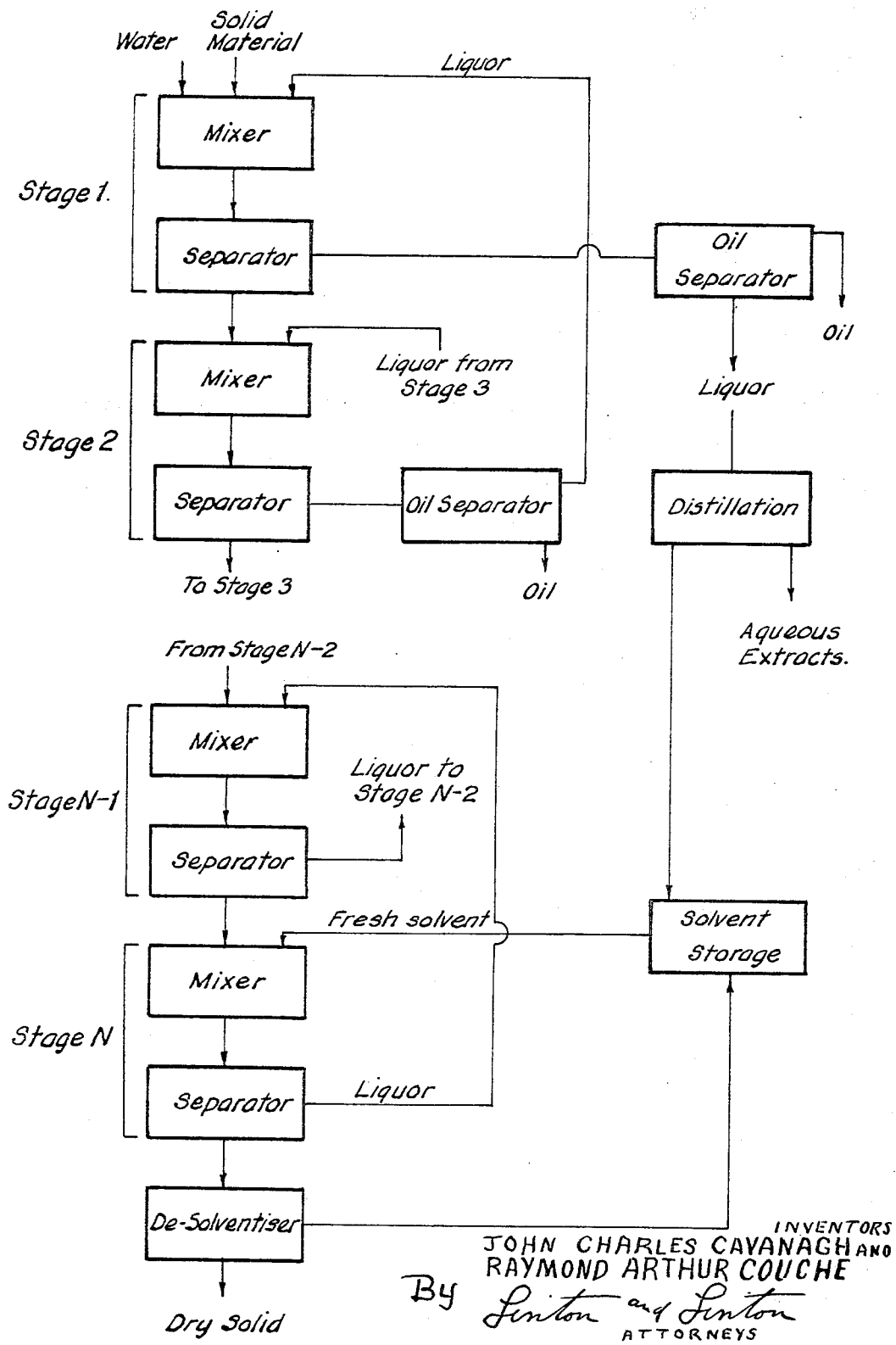

3,408,374
Patented Oct. 29, 1968

3,408,374
PROCESS FOR THE TREATMENT OF
VEGETABLE MATERIALS
John C. Cavanagh and Raymond A. Couche, both of 168
Adelaide Terrace, Perth, Western Australia, Australia
Filed Dec. 2, 1965, Ser. No. 525,270
8 Claims. (Cl. 260—412.4)

ABSTRACT OF THE DISCLOSURE

The invention relates to a multi-stage countercurrent process for extracting oils from vegetable materials such as rice bran (rice pollard), soybean, ground nuts, maize (corn) germ and coconut meat with hydrophilic solvents such as acetone in the presence of water added to the material or the extraction liquor.

---

The normal methods of producing oil from vegetable materials comprise pressing out the oil and/or solvent extraction of the oil. Because of the relatively low content of oil in some material pressing in itself does not produce a reasonably high yield of oil because a certain amount of oil must necessarily remain in the voids of the material during the pressing operation. Therefore, in order to obtain a high yield of oil it is necessary to use solvent extraction. Quite commonly because solvent extraction is necessary in any case for materials of relatively low oil content such as rice bran and soybean the pressing step is eliminated and the entire extraction is carried out with solvent.

The solvent commonly used is of petroleum hydrocarbon type, such as hexane. Conventional solvent extraction equipment is used, usually on a countercurrent principle. The hydrocarbon solvents commonly used are known to have little effect other than the extraction of the oil. In other words, the resultant meal product, apart from removal of oil, is essentially the same as the original material and could not be considered as being improved or refined in any way.

According to the present invention the vegetable material is extracted with a special type of solvent preferably in a series of stages in which the solvent travels countercurrently through the material. For clearness of terminology the material enters the first stage of treatment and passes out of the last stage of treatment and the fresh, new or clean solvent enters the last stage of treatment, and passes out of the first stage of treatment. Each stage embodies a container in which the material is agitated in contact with the solvent and followed by a means of substantially separating the solvent from the material. Suitable means for effecting separation of the extraction liquor from the material comprise a centrifugal decanter or a countercurrent washing filter. Generally the decanter may be used in the first two stages of the extraction and the filter in the remaining stages or the decanter may be used throughout for all stages. The separated solvent passes backwards into the container of the previous or next backward stage while the material passes to the container of the next forward stage. Any oil which forms a separate phase in the extraction liquor is removed therefrom before the extraction liquor passes to the next backward stage. The oil so removed may be retained in separate storage tanks or bulked together as one product depending upon the particular material grades of oil from each stage and the economic optimum for the process. It follows that the material passing out of the last stage of treatment is extracted of oil content, and, after desolventisation, is the resulting meal product of the process. In turn, the solvent which passes out of the first stage of the process is the outgoing extraction liquor from the overall process and may contain some oil in solution together with some other components. The process is simply illustrated in the flow sheet shown in the accompanying drawing.

The solvent used in the present invention is a hydrophilic solvent such as acetone or a mixture of solvents which is essentially hydrophilic such as a mixture of ethyl alcohol, ethyl acetate and acetone or a mixture of ethyl alcohol, ethyl acetate and isopropyl ether. When mixtures are used the relative proportions of the various components of the mixture may be readily determined by experiment to determine the proportions most suitable for the particular application under consideration. Generally with the first mixture specified above a ratio of 1:1:1 by volume is suitable while with the second mixture specified above a ratio 4:2:1 by volume is suitable. The material is treated not in its normal dry condition as in other processes but is treated in a wet condition. In some cases the material is inherently wet and in the case of dry materials the wetting may be brought about by adding water to the material (before treatment) to an amount such as 20–70% by weight expressed as water percent in the wetted material. Alternatively, the water may be added to the mixture of material and solvent in the stage 1 of treatment or to the extraction liquor entering stage 1. It is essential that the solvent or mixture of solvents while being hydrophilic to the extent of being able to mix with substantial water, is also a fat or oil solvent in its relatively pure form when it contains little or no water. Furthermore, the solvent or mixture should have a boiling point or boiling range lower than the boiling point of water.

Thus in the counter current process of the present invention the material when it first enters the extraction process is in contact with a mixture of solvent and water in which the proportion of water is fairly substantial, amounting to about 20–50% by weight. As the material progresses further through the process, it comes in contact with solvent containing progressively less and less water, and in the last stage of treatment is in contact with new or clean solvent containing little or no water.

The solubility of the oil in the solvent is low in the first and second stages of the process because of the water content of the solvent and consequently the solvent in these earlier stages contains oil not only in solution but also in a separate phase which may sink to the bottom of the solvent or float on the top of the solvent or may exist in the form of globules dispersed through the solvent. In the process of the present invention the oil which forms a separate phase in this way is separated from the extraction liquor after it leaves one stage and before it is fed into the next backward stage. Generally the process is so regulated by control of the quantity of water and solvent in relation to the quantity of oil present in the material and by the number of stages so that a minimum of oil separates as a separate phase in the first stage. In the later stages of treatment in the regions where the solvent contains progressively less and less water, the solubility of the oil in the solvent is much higher such that efficient extraction of oil occurs within these regions. At least the last two stages should not contain free oil. In this way the overall progress achieves a highly efficient extraction of oil.

The oil which has been in solution in the solvent in the latter stages of extraction and then becomes thrown out of solution to form a separate phase during the progressive dilution of the solvent with water as it passes backwards from stage to stage is in a relatively pure and highly desirable form.

The oil which forms as a separate phase may be separated and recovered at any or all stages before the solvent flows into the next backward stage. Usually, most of such oil occurs in the solvent leaving stage 2 and is separated before this solvent enters stage 1. In this way, the solvent in stage 1 is almost entirely oil-free and contains about 20–50% water by weight.

The function of stage 1 is not an oil-extraction function but is essentially one in which the aqueous solvent extracts sugars, gums, pigments and other components which are soluble in aqueous solvent and these are carried away in the outgoing liquor from stage 1. Hence these components do not leave the process as impurities in the oil and neither do they pass forwards in the material under treatment and remain in the meal end-product. A distinct advantage exists insofar as the one amount of counterflowing solvent performs a solvent extraction function to produce high grade oil and also performs the distinctly different function of removing from the material non-oil components of the nature of sugars, gums, pigments etc.

In the case of some raw materials, a certain amount of oil inevitably is displaced from the material by aqueous solvent in the first stage and passes out with the aqueous solvent in the outgoing liquor. The aqueous solvent also has a tendency to dissolve a proportion of the free fatty acid component of the oil in the material and this also passes out in the outgoing liquor. If desired, the oil in the outgoing liquor is subsequently recovered, but is usually of lower grade and contains more free fatty acid than the oil separated at the intermediate stages.

The non-oil components which are removed by the aqueous solvent in stage 1 generally are polysaccharide matter and taste and smell components. Also, in certain cases, specific components are removed such as antitryptic digestive inhibitor and urease in the case of soybean, gossypol in the case of cottonseed and aflatoxin in the case of peanuts infected with the mould *Aspergillus flavus*.

The outgoing liquor from the extraction process is treated such that any oil occurring as a separate phase is allowed to separate. The top phase (i.e., of lower specific gravity) will consist of oil and small amounts of solvent while the bottom phase (i.e., of higher specific gravity) will consist of solvent-water with minor components dissolved therein. Usually it is found that the free fatty acid content of the oil is distributed partially in the bottom phase and partially in the top phase, consequently the oil which is separated is partially refined or contains less free fatty acid than a conventional crude oil. The two phases are separated by gravity decantation or by centrifuging. The top phase is treated by heating, preferably in a vacuum stripping column, in order to remove the small amount of solvent and to yield the oil in a relatively pure form. The solvent is recovered for re-use. The bottom phase is subjected to distillation, preferably by a fractionation or rectification method, so that the solvent is distilled off and condensed for re-use, and to leave behind as a residue the water and minor components usually in association with a small amount of oil with a high content of free fatty acids. This oil is that which remained in solution in the first stage solvent of high aqueous content and may be recovered if economically desirable. If desired, the aqueous residue may be concentrated by evaporation or otherwise treated for the recovery of desirable components therefrom.

The oil which is separated from the liquor between each stage may be combined with the oil separated from the outgoing liquor and stripped of solvent as stated earlier or alternatively the oils may be retained separately, solvent removed from each and the oils recovered as separate products.

The process of this invention, is illustrated in the following examples:

EXAMPLE I.—RICE BRAN

A countercurrent process of 8 stages, operating on the method previously described, was set up and brought into a balanced condition. The solvent used was a mixture by volume of 4 parts ethyl alcohol, 2 parts ethyl acetate and 1 part isopropyl ether. To each quantity of 250 gms. of rice bran entering stage 1 was added approximately 500 gms. of water. Corresponding to each 250 gms. of rice bran entering stage 1 an amount of 1575 millilitres of solvent was introduced into stage 8. In this example some oil existed in a "free" condition (i.e., as a separate phase) in the solvent passing backwards from stages 2 and 3. This oil was separated and allowed to join the outgoing liquor from stage 1 (i.e. the outgoing liquor from the overall process). The outgoing liquor from the overall process was treated according to the procedure previously described.

The following data were obtained from a total of two quantities of rice bran, i.e. from a total of 500 grams of rice bran:

Yield of oil, 77 grams.
Content of free fatty acids in oil, 1.8% (expressed as oleic acid).
Yield of meal product 299 grams (on bone-dry basis).
Protein content of meal product 18.5% (nitrogen $\times$ 6.25 calculated on bone-dry meal product).
Yield of minor components (not containing oil) on bone-dry basis, 64 grams.
Oil in association with minor components, 6.5 grams.
Content of free fatty acids in oil associated with minor components, 23.0%.

A part of the oil obtained in the above sample (that is, the main quantity of 77 grams and not including the oil associated with the minor components) was stored in a glass container with rubber stopper and was opened from time to time during a period of three months. No apparent change took place in the color of the oil and a repeat analysis for free fatty acid content gave the same value 1.8% as when the oil was first produced. After a further eleven months the free fatty acid content was unchanged at 1.8%.

The meal product was virtually free of taste and smell and could be described as being in a refined condition. After storing in a glass container with a polyvinyl insert screw-top and after numerous openings over a period of three months, the meal product showed no evidence of change or deterioration. After a further eleven months there was still no evidence of deterioration.

The minor components, when concentrated by evaporation to a strength of about 65% solids and 35% water, had the appearance of a dark brown syrup and had a smell rather resembling molasses: the taste was a combination of sweetness and bitterness.

EXAMPLE II.—SOYBEAN

An 8 stage countercurrent solvent system was used to extract soybeans. The solvent was a mixture of equal volumes of ethyl alcohol, ethyl acetate and acetone. Batches of 450 g. of soybean were processed as follows: Three hundred grammes of water and stage 2 liquor (900 g.) were mixed with the incoming soybean (450 g.) The soybean was comminuted in this solvent-water mixture then agitated hot (50° C.) for 5 minutes after which the solids and liquid were separated. The solid portion contained about an equal weight of retained liquid and this was further processed in the subsequent stages of the countercurrent system. The general temperature in each stage was 50°±5° C. and the retention period was 5 minutes.

The liquid (stage 1 liquor) contained approximately 30 percent water by weight, and other components in solution. The solvent was recovered by distillation and the "other components" were concentrated in an aqueous extract.

After stage 3 and before stage 4 the solid was recomminuted by high speed disintegrator in the presence of the solvent in order to reduce coarse particles to a finer size for more efficient oil extraction.

The only addition of fresh solvent was 900 g. to the solids from stage 7 to form stage 8. The only water addition to the system was made in stage 1. Because of the countercurrent equilibria established the respective percentages of water in the liquor of stages 1 to 8 were approximately 30, 10, 5.5, 4.5, 4.1, 4.0, 4.0, 4.0, when the fresh solvent contained 4.0 percent water by mass.

In the operation of the countercurrent system, oil occurred as a separate phase in the solvent passing backwards from stages 5, 4, 3 and 2 into stages 4, 3, 2 and 1 respectively and also in the outgoing liquor from stage 1. An inter-stage separation of the oil in the solvent from stages 5, 4, 3 and 2 was carried out by allowing the oil to separate by gravity at the bottom of the solvent and draining it off. The largest amount of oil so recovered was from the solvent passing backwards from stage 4. The oil in the solvent from stage 1 was also separated but in this case by decantation from on top of the solvent. (The solvent here containing more water and being of higher specific gravity.) The oil drawn off by phase separation both from the inter-stage solvents and the solvent from stage 1 were combined, stripped of residual solvent by steam distillation and dried at 120° C.

In concluding the countercurrent operation and in order to get a mass balance between ingoing material and products, the last batch of soybeans was carried through all stages and all the liquors were distilled in order to recover the oil contained in them. This oil was stripped of solvent, dried at 120° C. and added to the oil recovered during the countercurrent operation. The total oil recovered was 320 g. from 2,250 g. soybean i.e. a yield of 14.2% of the soybean. The oil was of high quality, apparently free of gum and contained 0.22 percent free fatty acid expressed as oleic acid.

The solid residue from stage 8 was desolventised by heating in a forced circulation air oven at 65° C. and finally under a vacuum (755 mm.) at 65° C. A total of 1470 g. of dry solids were recovered. This was screened into 3 sizes which were analysed separately for crude protein and residual oil with the following results:

| | Fraction wgt., g. | N×6.25= Crude Protein, percent | Residual Oil, percent |
|---|---|---|---|
| +44 mesh | 78 | 21.6 | 0.78 |
| −44+60 mesh | 141 | 46.0 | 1.49 |
| −60 mesh | 1,251 | 61.1 | 1.47 |

Analysis of the solid product indicated the antitryptic digestive inhibitor and urease, both normally present in soybean meal, were removed from the meal without resorting to a "toasting" technique to destroy or inactivate them. The meal consequently consisted of a higher grade protein because heat damage has been avoided.

The aqueous extract after solvent recovery from stage 1 liquor contained a thick yellowish emulsion. This emulsion was soluble in alcohol, both hot and cold, and also in excess hexane.

After dissolving in hexane two products were obtained, (1) water soluble material in an aqueous layer, and (2) hexane soluble (most probably gums and lecithins) in a hexane layer.

These products were recovered separately and yielded 217 g. solid in the aqueous extract.
16 g. gummy solid from the hexane extract.

The overall material balance for the process was:
Input:
Soybean _____g__ 2250
Output: Grams
  Dry solids _____ 1470
  Oil _____ 320
  Solids in aqueous extract _____ 217
  Solids in hexane extract _____ 16
  Water content and experimental losses by (difference) _____ 243

The normal water content of the soybean approximates 10 percent consequently the experimental balance was satisfactory.

EXAMPLE III.—COTTONSEED

An 8 stage countercurrent solvent system was used to extract cottonseed kernels (meats). The solvent was a mixture of ethyl alcohol, ethyl acetate and isopropyl ether in the volume ratio of 4:2:1.

Ten batches of 200 g. cottonseed kernel were processed as follows:

Four hundred and twenty grammes of water were added to the kernels which were ground in a disintegrator to a thin creamy consistency. This quantity of water was required to permit effective grinding. This was mixed with 1300 g. of stage 2 liquor and agitated hot (50° C.±5° C.) for 5 minutes after which the solid and liquid were separated. The solid which contained approximately an equal mass of liquid was further processed through the subsequent stages of the countercurrent system. The general process condition in each stage was 5 minutes retention with agitation at 50°±5° C. The liquid (stage 1 liquor) contained approximately 33 percent water by weight and other components in solution. The solvent was recovered from the stage 1 liquor by distillation and the soluble components were concentrated in the aqueous extract.

After stage 3 and before stage 4 extraction the solid was recomminuted by high speed disintegration in the presence of the solvent in order to reduce coarse particles to a finer size for more efficient oil extraction.

The only addition of fresh solvent was 1300 g. to the solid from stage 7 to form stage 8. The only water addition to the system was made in the wet grinding of the kernels prior to mixing with stage 2 liquor to form stage 1. Because of the countercurrent equilibria the respective percentages of water in the liquor of stages 1 to 8 were approximately 33, 10, 5, 4.2, 4.1, 4.0, 4.0, 4.0 when the fresh solvent contained 4 percent of water by weight.

In the operation of the countercurrent system, the oil which occurred as a separate phase in the solvent leaving stage 2 was separated so that this solvent passed into stage 1 in an oil-free condition. Oil was not liberated by contact of the solvent and kernels in stage 1 and the outgoing liquor from stage 1 did not contain oil in a separate phase. The oil which was separated from the liquor leaving stage 2 was stripped of solvent by steam distillation and dried at 120° C. under vacuum (755 mm.) this oil was light yellow and of apparent good quality, with a free fatty acid content of 0.34% expressed as oleic acid.

The total oil recovered from 2000 g. of kernels was 444 g. The oil in solution in the liquors of stages 2–8 at the conclusion of the countercurrent operation was not recovered and probably amounted to 50 to 100 g.

The solid residues were desolventised by heating in a force circulation air oven at 65° C. A total weight of 1048 g. was recovered from 2000 g. of kernels and screened into the following 3 products.

| | Wgt. (G) | Percent of original kernel | Percent protein (N×6.25) | Residual oil, percent |
|---|---|---|---|---|
| Hulls and linters | 140 | 7.0 | | |
| Middlings (−30+100 mesh) | 244 | 12.2 | 61.0 | 3.83 |
| "Flour" (−100 mesh) | 664 | 33.2 | 69.5 | 0.52 |
| | 1,048 | 52.4 | | |

Analysis of the "flour" for free gossypol indicated almost complete removal of this toxic component, the very low content of 0.005 percent being obtained.

Nitrogen solubility in 0.02 N sodium hydroxide by the method of Lyman, Chang and Couche (J. Nutrition 49.679 (1953)) was 81.3% which is higher than that of most conventional cottonseed meals and is an indication of good protein quality. The removal of free gossypol by dissolution rather than binding it chemically to an essential amino acid (lysine) also improves the quality of the resultant meal or protein "flour" over and above that of conventional meals.

A special batch of 200 g. was procesesd in the countercurrent system and the solids from each stage were analysed for oil retention and free gossypol.

These results are shown as follows:

| Stage | Oil content (Percent dry solids) | Free Gossypol (percent) |
|---|---|---|
| 1 | 32.4 | 0.03 |
| 2 | 14.3 | 0.01 |
| 3 | 6.4 | 0.01 |
| 4 | 2.3 | 0.01 |
| 5 | 1.2 | 0.01 |
| 6 | 0.8 | 0.01 |
| 7 | 0.7 | 0.01 |
| 8 | 0.6 | <0.1 |
| Original kernel | | 0.84 |

These results indicate the effectiveness of the process (i.e. the aqueous-solvent system) in removing other components, such as the toxic compound gossypol, from the solid product. The protein product was tasteless, odourless and suitable for consumption by all monogastric animals and human beings. Also by application of oil recovery from stage 2 solvent liquor the removal of gossypol and colouring matter from the crude oil is virtually complete. Consequently both meal and oil obtained by the process were of improved quality.

The aqueous extract after solvent recovery from stage 1 liquor was concentrated. A thick "pitchy" layer separated from the aqueous solution during concentration. This was recovered separately from the aqueous concentrate which consisted mainly of polysaccharides and water soluble colouring matter.

The extracts recovered were: Grams
"Pitchy" material _____ 103
Polysaccharide material _____ 142

The total material balance was satisfactory when allowance was made for oil left in solution in the liquors of the final batch.

Recovery accounted for: Grams
Solids _____ 1048
Oil _____ 444
Extracts (total solids) _____ 233
                                            1715
Unaccounted (inherent water, experimental losses and oil in solution) _____ 285
                                            2000

EXAMPLE IV.—GROUND NUTS

A six stage countercurrent solvent system was used to extract ground nut kernels. The solvent was a mixture of ethyl alcohol, ethyl acetate and isopropyl ether in the volume ratio of 4:2:1.

Four batches of 250 g. of kernels were processed as follows:

Five hundred and twenty grammes of water were added to each 250 g. kernels which were ground to a thin creamy slurry with a total water content of 70 percent. This was mixed with 1620 g. of stage 2 liquor and agitated hot (50°+5° C.) for 5 minutes after which the solid and liquid were separated. The solid, which contained approximately an equal mass of liquid, was further processed through the subsequent stages of the countercurrent system. The general conditions in each stage were retention and agitation time 5 minutes and temperature 50°±5° C. The liquid (stage 1 liquor) contained approximately 33% water by mass and other components in solution as well as oil which formed a separate phase. The stage 1 liquor was distilled for solvent recovery. The oil and other components were retained in the aqueous extract.

After stage 3 and before stage 4 extraction the solid was recomminuted in the presence of the solvent to ensure a fine particle size and adequate oil extraction.

The only addition of solvent to the system was 1620 g. to the solid from stage 5 to form stage 6. The only water addition to the system was to the kernels, prior to stage 1.

The countercurrent equilibria established the respective mass percentage of water in the liquor of stages 1–6 as approximately 33, 10, 5, 4.2, 4.1, 4.0, when the fresh solvent contained 4 percent of water by weight.

Oil separated into 2 phases in stages 1 to 3, but only on cooling in stage 3. Oil which separated from cold stage 3 liquor was separated and combined with that from stage 2, and the solvent removed by steam distillation after which it was dried at 120° C. under vacuum (755 mm.). This oil was almost water white and contained 0.30% free fatty acid expressed as oleic acid. The total oil yield was 401 g. from 1000 g. kernels. Oil remaining in solution in the final liquors and not recovered probably accounted for up to 100 g.

The solid residues were desolventised in a forced circulation air oven at 65° C. They were almost pure white, tasteless and odourless and suitable for use as a protein source for human beings. The total weight of dry product was 379 g. which was screened into 3 products which analysed as follows:

| Screen size. (B.S.S.) | Wgt. (g.) | Protein (n×6.25) percent dry solid | Oil Content (Percent dry solid) |
|---|---|---|---|
| +60 mesh | 13.5 | 68.7 | |
| −60+100 mesh | 22.9 | 68.6 | |
| −100 mesh | 342.6 | 70.9 | 0.17 |

The aqueous extract was concentrated to produce 97 g. of thick syrup which contained 79 g. solid matter, mainly polysaccharides and flavour components.

The material balance was as follows:

Grams
Solid products _____ 379
Oil _____ 401
Extract solids _____ 79
Balance (inherent water, oil in solution and experimental losses. _____ 141

Since inherent water is from 4 to 7 percent and the oil in solution up to 10 percent, the balance was satisfactory.

An additional extraction using ground nut kernels containing 4 parts per million of aflatoxin B1, an extremely toxic product of the mould aspergillus flavus resulted in the production of a meal which was reported by the Tropical Products Institute, London as qualitatively reporting "low or negative" aflatoxins and quantitatively reporting "less than 0.007 part per million B1."

The process therefore was effective in removing this toxic component from the solid while simulanteously producing a high quality oil.

EXAMPLE V.—MAIZE (CORN) GERM

An 8 stage countercurrent solvent system was used to extract maize (corn) germ. The germ was reconstituted to the condition under which it was recovered from the wet milling process viz: the wet germ containing 50 to 53 percent water. The solvent was a mixture of equal volumes of ethyl alcohol, ethyl acetate and acetone.

Batches of 250 g. of dried germ were processed as follows:

Water was added (250 g.) to the germ and left standing for 15 minutes to approximately reconstitute the wet germ. The wet batch was mixed with 800 g. of stage 2 liquor and comminuted in a high speed cutter (Waring Blendor). The mixture was then agitated hot (50°±5° C.) for 5 minutes and the solid and liquid separated. Oil present as a separate phase in the liquid (stage 1 liquor) was separated and the solvent liquor discarded. Recovery of solvent was not pursued experimentally nor was the investigation and recording of the extracted components.

The solid was further processed through the subsequent stages of the system. The normal extraction temperature was 50°±5° C. and the retention and agitation time was five minutes per stage.

The only addition of fresh solvent was 800 g. to the solid from stage 7 to form stage 8. The only water addition to the system was that added to reconstitute the dried germ. It is visualised that in practice the wet germ from the filter would be fed directly into the process. The countercurrent equilibria resulted in the approximate respective percentage of water, by mass, in the liquors of stages 1 to 8 as 35, 14, 7, 5, 4.3, 4.1, 4.0, 4.0 when the fresh solvent contained 4.0 percent water by weight.

Oil separated in stages 1-7 as a separate phase (stages 6 and 7 on cooling) and when the oil was removed from the stage 2 liquors little, if any, oil was extracted by or formed as a separate phase in stage 1.

Oil was recovered by separation of the oil phase from the aqueous-solvent liquors of each stage. The oil was stripped of solvent by steam distillation and dried at 120° C.

From 1750 g. of dried germ the following yields were obtained:

| | Grams |
|---|---|
| Oil | 840 |
| Solid residue | 721 |
| Balance (inherent moisture, losses and soluble components) | 189 |

The oil recovered appeared of high quality and the meal analysed as approximately 23 percent crude protein (N×6.25) with an oil content of approximately 3.6 percent. The high residual oil indicated either the need for finer comminution before extraction or the need for re-comminution at an intermediate stage of extraction.

This example demonstrates the advantage of the process in direct application to a wet vegetable material combining the effective recovery of a high quality oil with that of producing a dry meal suitable for use as a protein supplement. The oil was apparently of higher quality than that produced by present methods.

EXAMPLE VI.—COCONUT MEAT

By coconut meat is meant the fresh wet coconut flesh before drying into copra. Its moisture content is approximately 50 percent and oil content approximately 33 percent.

An 8 stages countercurrent solvent system was used to extract fresh coconut meats. The solvent was a mixture of ethyl alcohol, ethyl acetate, and isopropyl ether in the volume ratio of 4:2:1. Batches of 500 g. were processed as follows:

Coconut meat was shredded and mixed with 750 g. stage 2 liquor to form stage 1. This mixture was agitated at 50°±5° C. for 5 minutes and the solid and liquid separated. Some of the coconut oil rendered from the meat formed a separate phase in the separated stage 1 liquor. The solid was processed through the subsequent stages of the system. The normal extraction temperature was 50°±5° C. and retention and agitation time was five minutes.

After stage 2 and before stage 3 extraction, the solid was comminuted by high speed disintegrator in the presence of the solvent.

The only addition of fresh solvent was 750 g. to the solids from stage 7 to form stage 8.

No water was added to the system because the natural coconut meat contained approximately 50 percent inherent moisture. The approximate respective percentages of water by mass in the liquors of stages 1 to 8 were 37, 15, 8, 5.5, 4.4, 4.2, 4.1, 4.0 at equilibrium when the fresh solvent contained 4.0 percent of water by weight.

The oil formed a separate phase in stages 1-4 (by cooling in 3 and 4) and it was recovered by removal of this phase from the solvent liquors. The combined oil was stripped by steam distillation and dried at 120° C.

The solid product was dried in a forced circulation air oven at 65° C. and screened into 2 products, plus 100 mesh and minus 100 mesh. The minus 100 mesh product (coconut "flour") was analysed for crude protein and residual oil content with the following result:

| | Percent |
|---|---|
| Crude protein (N×6.25) on dry solid | 35.1 |
| Residual oil, on dry solid | 0.30 |

Eight batches were processed, the seventh being divided for samples to indicate oil extraction and the eighth to indicate the need for comminution. Batch 8 was not comminuted after stage 2 but processed in entirety as shredded material. Oil extraction samples were taken also for batch 8. Consequently yields obtained were not a true indication of complete recovery.

A total of 1117 g. oil was recovered to which a further 200 g. or so should be anticipated as recovery from solvent and unextracted solid i.e. a yield of approximately 33 percent. The oil was water white and of high quality. The free fatty acid content was 0.09% expressed as oleic acid and was of an acceptable refined grade as regards free fatty acid.

The total solid recovered from 6 batches was 385 g. i.e. a yield of 12.8%; 50 percent was "flour" and 50% was plus 100 mesh. The flour was tasteless, pure white, odourless, with low fibre content. It was suitable for use as a protein source for any application including consumption by human beings.

The oil extraction revealed by the final 2 batches indicates the need of fine comminution. These results were as follows:

| | After Stage | Residual Oil (percent dry solid) |
|---|---|---|
| Batch 7 | 2 | 35.0 |
| | 4 | 9.2 |
| | 6 | 2.7 |
| | 8 | 1.4 |
| Batch 8 | 4 | 19.8 |
| | 8 | 9.0 |

The aqueous extract which remained after solvent distillation from stage 1 liquor was concentrated to produce 168 g. of coconut syrup. This syrup contained polysaccharides and other components. It had a pleasant coconut flavor.

The overall balance was satisfactory considering the variations introduced into the total procedure viz.

| | Percent |
|---|---|
| Solid products | 12.8 |
| Oil | 33.0 |
| Extract (estimated) dry solid | 4.0 |
| Inherent moisture | 50.0 |
| Balance (by difference) | 0.2 |

This example demonstrated the application of the process to a wet raw material with the benefit of avoiding the drying step.

EXAMPLE VII.—COFFEE GROUNDS

By coffee grounds is meant the wet solid residue remaining after the extraction of the water soluble coffee for the production of instant coffee. The usual water content of the grounds is 60 percent and the commercially produced grounds used in the following example contained 62 percent water by analysis.

A six stage countercurrent solvent system was used to extract coffee grounds. The solvent was a mixture of ethyl-alcohol, ethyl acetate, and isopropyl ether in the volume ratio of 4:2:1. Batches of 700 g. were processed as follows:

The wet grounds were mixed with 1000 g. of stage 2 solvent agitated for 5 minutes at 50°±5° C. and the solid and liquid separated. The solid material, which retained approximately an equal mass of liquid, was processed through the other stages of the countercurrent system, the general extraction condition being 50°±5° C. for 5 minutes. The liquid (stage 1 liquor) was retained for recovery of oil and other components which were in solution.

No water was added to the system, the total water being that retained by the wet grounds. The only fresh solvent addition was 1000 g. which was mixed with the solid from stage 5 to form stage 6. The approximate water content of the liquors of stages 1 to 6 were 44, 16, 7.5, 5.1, 4.3, 4.1 percent by mass respectively when the fresh solvent contained 4.0 percent water by weight and the solvent extraction system was at equilibrium.

After processing 4 batches to establish equilibrium conditions two batches were processed for quantitative data.

Oil formed a separate phase in stages 2–5 (on cooling in stage 5), very little separated in stage 2 and the major quantity separated in stage 4. The oil was dark brown with a faint coffee smell. It contained 0.6 percent free fatty acid expressed as oleic acid and refined readily. The yield was 114.9 g. equivalent to 8.2 percent of the wet grounds or 21.6 percent of the dry grounds.

Hexane extraction of the stage 1 liquor, prior to distillation recovery of solvent, recovered 12.2 g. of waxy oil (which was a solid wax at a normal ambient temperature of 20–25° C.). This was very dark brown to black in color and possessed a very strong odor of burnt coffee. The yield was equivalent to 2.3 percent of the dry coffee grounds.

The aqueous extract recovered after solvent distillation of stage 1 liquor contained 7.0 g. solid (dry) and evaporation of the aqueous extract yielded 9.0 g. dry solid. Thus the total extracted solids were 16.0 g. equivalent to a yield of 3.0% of the dry grounds.

The solid residue from stage 6 was desolventised by heating in a forced circulation air oven at 65° C. The total weight of dry residue was 391 g. equivalent to a yield of 73.5 percent of the dry grounds. This residue was tasteless and had a protein value of 14 percent.

The process mass balance was:

Input, 1,400 g. wet grounds=532 dry grounds.

| Output | Weight (g.) | Percent of dry grounds |
| --- | --- | --- |
| Oil | 114.9 | 21.6 |
| Wax | 12.2 | 2.3 |
| Solid residue | 391.0 | 73.5 |
| Solid in extract | 16.0 | 3.0 |
| Experimental variation | −3.9 | −0.4 |
| | 532.0 | 100.0 |

This example demonstrated the application of the process to a wet vegetable type material with the advantage of recovering an easily refined oil which cannot be obtained by present methods which involve drying as the first step.

EXAMPLE VIII.—RICE POLLARD

In order to compare the oil extracted two samples of rice pollard which had been standing several weeks at ambient temperature, and therefore in a stage of considerable deterioration, were extracted, one by hexane in a conventional manner and the other by an extraction process as described above, the solvent being a mixture of ethyl alcohol, ethyl acetate and isopropyl ether. Four stage extraction with hexane was compared with six stage extraction with the mixture because stages 1 and 2 of the present process were regarded as effective non-oil extraction stages. Oil yields were not obtained but residual oil contents were determined to indicate the relative extraction efficiency.

Hexane extraction was carried out in three batches using countercurrent technique with 600 ml. of solvent and 250 g. of pollard per stage. The oil recovered had a free fatty acid content of 17.4% expressed as oleic acid. The residual oil content of the meal after extraction was 12.1% of the dry weight of meal.

Extraction in accordance with the process of the present invention was carried out with four batches of 250 grammes. The first stage consisted of 250 g. rice pollard, 200 g. water, 675 mls. of stage 2 solvent liquor, 675 mls. of fresh solvent were added at stage 6, this being the only point at which fresh solvent was added. Oil was recovered by separating the oil which formed separate phases in the liquors of stages 2–4. This oil contained 2.7 percent free fatty acid expressed as oleic acid. The residual oil content of the dry meal was 2.2 percent.

This example clearly demonstrates the advantage of the present invention in producing an oil of low free fatty acid content, that is the oil is of "partially refined" grade when compared with oil produced by the conventional procedure using hexane.

We claim:

1. A process for the extraction of oil from vegetable materials which consists in subjecting the vegetable material to countercurrent solvent extraction in at least three stages with a hydrophilic organic solvent in which the material moves forwardly and the extraction liquor moves rearwardly, relative to said stages, controlling the solvent water ratio in each stage so that in the first of said stages the water content of the extraction liquor is between 20% and 50% by weight and in the last of stages the water content of the extraction liquor is of the order of 4% by weight and in the intermediate stages the water content of the extraction liquor progressively decreases in each intermediate stage from 30% by weight to 4% by weight whereby substantially no oil separates from the extraction liquor in at least said last stage and whereby a minimum quantity of oil separates from the extraction liquor in said first stage and further separating any oil which separates as a separate phase from the outgoing extraction liquor from each of said intermediate stages from said outgoing extraction liquor after said outgoing extraction liquor leaves one of said intermediate stages and before said outgoing extraction liquor moves rearwardly to the next stage.

2. A process for the extraction of oil from vegetable materials which consists in subjecting the vegetable material to countercurrent solvent extraction with at least one hydrophilic organic solvent having a boiling point lower than that of water in which the material moves forwardly and the extraction solvent moves rearwardly of a plurality of stages with each stage having a vessel in which the material and solvent are mixed followed by a separation of most of the solvent from the material and with the material containing about an equal weight of solvent passing to the vessel of the next forward stage to the last stage where it leaves the process and the separated solvent passing to the vessel of the next rearward stage to the first stage where it leaves the process, adjusting the rate of passage of the forward-going material and the rate of passage of the rearward going solvent so that in the first stage the material is in contact with solvent containing about 20% to 50% by weight of water in which oil is almost insoluble and only a minor amount of oil is displaced from the material to exist in a separate phase in the mixture of solvent and water and that in at least one following intermediate stage the amount of water in the solvent is about 10% by weight to 5% by weight of the solvent in which oil present is partly in solution in the solvent and exists partly as a separate phase in the solvent and further followed by at least one more stage in which the water content of the solvent is less than about 5% by weight of the solvent and in which oil present is all in solution, separating the oil which is present as a separate phase in at least one of the intermediate stages from the solvent and removing said separated oil from the process before said solvent passes rearwardly into the first stage.

3. A process as claimed in claim 2 wherein the hydrolphilic solvent is selected from the group comprising acetone, a mixture of ethyl alcohol, ethyl acetate and isopropyl ether and a mixture of ethyl alcohol, ethyl acetate and acetone.

4. A process as claimed in claim 2 wherein the hydrophilic solvent is a mixture of ethyl alcohol, ethyl acetate and isopropylether in a ratio of 4:2:1 by volume.

5. A process as claimed in claim 2 wherein the hydrophilic solvent is a mixture of ethyl alcohol, ethyl acetate and acetone in the ratio of 1:1:1 by volume.

6. A process as claimed in claim 2 wherein the material is subjected to a secondary comminution during the extraction.

7. A process as claimed in claim 2 wherein the water content of the first stage is adjusted to between 20% and 50% by weight by adding water to the material.

8. A process as claimed in claim 2 wherein the water content of the first stage is adjusted to between 20% and 50% by weight by adding water to the extraction liquor passing from the second stage to the first stage.

References Cited

UNITED STATES PATENTS

| | | | |
|---|---|---|---|
| 1,607,731 | 11/1926 | Eddy | 260—412.4 |
| 1,648,670 | 11/1927 | Atwell | 260—412.4 |

NICHOLAS S. RIZZO, *Primary Examiner.*

A. M. TIGHE, *Assistant Examiner.*